United States Patent
Tang et al.

(10) Patent No.: US 9,107,088 B2
(45) Date of Patent: Aug. 11, 2015

(54) SOFTWARE OBTAINING METHOD AND COMMUNICATION DEVICE

(75) Inventors: Meijun Tang, Shanghai (CN); Chunyuan Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 255 days.

(21) Appl. No.: 13/530,836

(22) Filed: Jun. 22, 2012

(65) Prior Publication Data

US 2012/0266152 A1 Oct. 18, 2012

Related U.S. Application Data

(63) Continuation of application No. PCT/CN2010/080454, filed on Dec. 29, 2010.

(30) Foreign Application Priority Data

Dec. 30, 2009 (CN) .......................... 2009 1 0238863

(51) Int. Cl.
```
G06F 9/44      (2006.01)
H04W 24/02     (2009.01)
G06F 9/445     (2006.01)
H04W 8/00      (2009.01)
H04W 88/10     (2009.01)
```
(52) U.S. Cl.
CPC .................. *H04W 24/02* (2013.01); *G06F 8/61* (2013.01); *H04W 8/00* (2013.01); *H04W 88/10* (2013.01)

(58) Field of Classification Search
USPC .......................................................... 717/168
See application file for complete search history.

(56) References Cited

U.S. PATENT DOCUMENTS

| 7,200,390 B1 * | 4/2007 | Henager et al. ................ 455/419 |
|---|---|---|
| 7,756,548 B2 * | 7/2010 | Laroia et al. ................... 455/561 |
| 2002/0111187 A1 * | 8/2002 | Harada et al. ................. 455/553 |
| 2002/0144134 A1 | 10/2002 | Watanabe et al. |
| 2008/0253434 A1 | 10/2008 | March et al. |
| 2009/0221319 A1 * | 9/2009 | Lan et al. .................... 455/550.1 |
| 2011/0130119 A1 * | 6/2011 | Gupta et al. ................... 455/411 |

(Continued)

FOREIGN PATENT DOCUMENTS

| CN | 101064643 A | 10/2007 |
|---|---|---|
| CN | 101188818 A | 5/2008 |

(Continued)

OTHER PUBLICATIONS

Extended European Search Report issued in corresponding European Patent Application No. 10840581.2, mailed Dec. 14, 2012.

(Continued)

*Primary Examiner* — John Chavis
(74) *Attorney, Agent, or Firm* — Brinks Gilson & Lione

(57) ABSTRACT

A software obtaining method and a communication device are disclosed. The method includes: obtaining a working standard of a multi-mode base station; determining a first logic type corresponding to a Base-Band Unit (BBU) of the multi-mode base station according to the working standard of the multi-mode base station; determining a type of software required for running the BBU according to the determined first logic type and a hardware type of the BBU; and obtaining the software required for running the BBU according to the determined software type. Through the technical solution, the software of the BBU can be downloaded accurately, which improves efficiency and accuracy of software obtaining.

13 Claims, 7 Drawing Sheets

(56) References Cited

U.S. PATENT DOCUMENTS

| | | | |
|---|---|---|---|
| 2011/0307727 A1* | 12/2011 | Wu | 713/323 |
| 2012/0220336 A1* | 8/2012 | Lan et al. | 455/552.1 |
| 2012/0224617 A1* | 9/2012 | Feher | 375/222 |
| 2014/0106805 A1* | 4/2014 | Yu | 455/509 |
| 2014/0146743 A1* | 5/2014 | Gupta et al. | 370/328 |
| 2014/0286228 A1* | 9/2014 | Lu et al. | 370/312 |

FOREIGN PATENT DOCUMENTS

| | | |
|---|---|---|
| CN | 101192948 A | 6/2008 |
| CN | 101778497 A | 7/2010 |

OTHER PUBLICATIONS

Written Opinion of the International Searching Authority issued in corresponding PCT Patent Application No. PCT/CN2010/080454, mailed Apr. 21, 2011.

International Search Report issued in corresponding PCT Patent Application No. PCT/CN2010/080454, mailed Apr. 21, 2011.

Office Action issued in corresponding Chinese Patent Application No. 200910238863.1, mailed Feb. 29, 2012.

* cited by examiner

SOFTWARE OBTAINING METHOD AND COMMUNICATION DEVICE

CROSS-REFERENCE TO RELATED APPLICATIONS

This application is a continuation of International Application No. PCT/CN2010/080454, filed on Dec. 29, 2010, which claims priority to Chinese Patent Application No. 200910238863.1, filed on Dec. 30, 2009, both of which are hereby incorporated by reference in their entireties.

FIELD OF THE INVENTION

The present invention relates to the field of communications technologies, and in particular, to a software obtaining method and a communication device.

BACKGROUND OF THE INVENTION

A multi-mode base station may work in different communication modes. A Main Processing and Transmission unit and a Base-Band Unit (BBU) are important hardware of the base station. Generally, the Main Processing and Transmission unit runs the same software, but the BBU runs different software depending on the working mode of the base station. It is understandable that the BBU is also known as a baseband board.

The software of the BBU may be downloaded from a Network Management System (NMS). At the time of downloading BBU software from the NMS, the corresponding software may be downloaded according to the logic type and hardware type of the BBU. At the time of downloading BBU software from the NMS, the BBU software is downloaded according to the default data on the Main Processing and Transmission unit.

In the prior art, only a single type of BBU is allowed in the default data of the Main Processing and Transmission unit. When the type of BBU in the default data is different from the desired type, the downloaded software is not the software required by the BBU.

For example, the BBU of mode A is set in the default data of the Main Processing and Transmission unit, and the software of the BBU of mode A can be downloaded from the NMS when the base station starts up; however, for the BBU of mode B, only the software of the BBU of mode A is available for downloading from the NMS, and, after this software is downloaded and activated, the BBU will find no software corresponding to the BBU of mode B in the master area of the Main Processing and Transmission unit. In this case, software replenishment is required. Software replenishment increases time overhead of starting up the base station greatly, and slows down the startup of the base station.

SUMMARY OF THE INVENTION

The embodiments of the present invention provide a software obtaining method and a communication device to improve efficiency and accuracy of software obtaining.

In order to solve the technical problem, a software obtaining method is provided in an embodiment of the present invention, which includes: obtaining a working standard of a multi-mode base station; determining a first logic type corresponding to a BBU of the multi-mode base station according to the working standard of the multi-mode base station; determining a type of software required for running the BBU according to the determined first logic type and a hardware type of the BBU; and obtaining the software required for running the BBU according to the determined software type.

A communication device is provided in an embodiment of the present invention, which includes: a first obtaining module, configured to obtain a working standard of a multi-mode base station; a first determining module, configured to determine a first logic type corresponding to a BBU of the multi-mode base station according to the working standard obtained by the first obtaining module; a second determining module, configured to determine a type of software required for running the BBU according to the first logic type determined by the first determining module and a hardware type of the BBU; and a second obtaining module, configured to obtain the software required for running the BBU according to the software type determined by the second determining module.

Compared with the prior art, the embodiments of the present invention bring at least the following benefits:

In the embodiments of the present invention, the working standard of the multi-mode base station is obtained, the logic type corresponding to the BBU of the multi-mode base station is determined, and the type of the software required for running the BBU is determined according to the logic type corresponding to the BBU and the hardware type of the BBU. In this way, the software is downloaded accurately, and the software obtaining is more efficient and accurate.

BRIEF DESCRIPTION OF THE DRAWINGS

To make the technical solution in the present invention or the prior art clearer, the following outlines the accompanying drawings involved in description of the embodiments of the present invention or the prior art.

DETAILED DESCRIPTION OF THE EMBODIMENTS

The following detailed description is given in conjunction with the accompanying drawings to provide a thorough understanding of the present invention. Evidently, the drawings and the detailed description are merely representative of particular embodiments of the present invention rather than all embodiments. All other embodiments, which can be derived by those skilled in the art from the embodiments given herein without any creative effort, shall fall within the protection scope of the present invention.

To make the objectives, features and merits of the technical solution under the present invention clearer, the following describes the embodiments of the present invention in more detail with reference to the accompanying drawings.

The technical solution under the present invention is applicable to any scenario of multi-mode base stations, in which the principles are similar.

Embodiment 1

Figure 1:
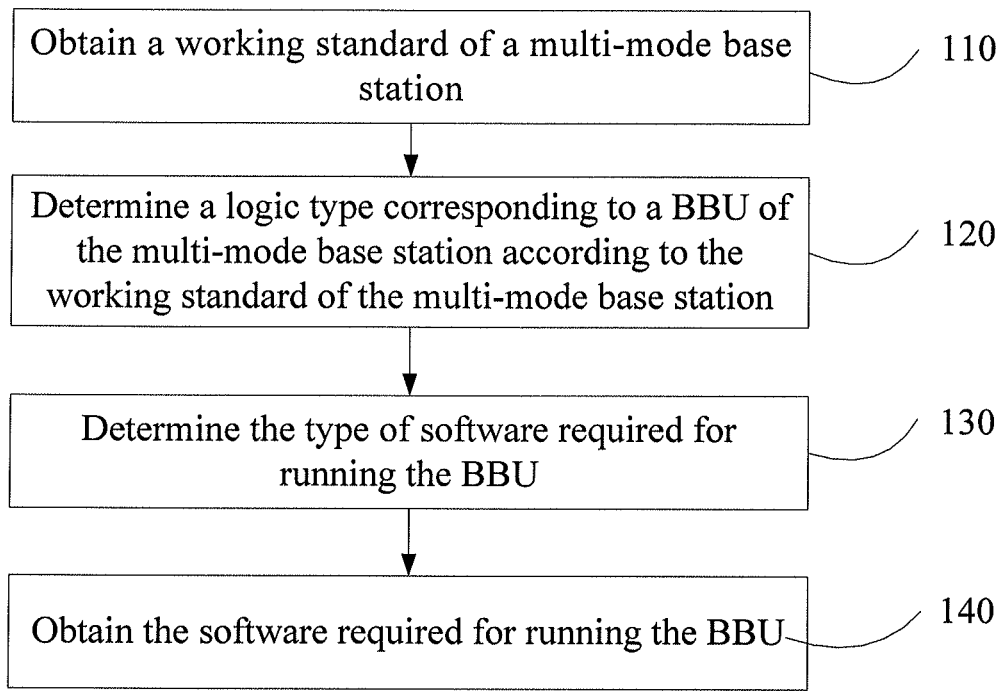
FIG. 1 is a schematic flowchart of a software obtaining method in Embodiment 1 of the present invention.

Embodiment 1 of the present invention relates to a software obtaining method. FIG. 1 is a schematic flowchart of a software obtaining method in Embodiment 1 of the present invention. As shown in FIG. 1, the software obtaining method in Embodiment 1 includes the following steps:

Step 110: Obtain a working standard of a multi-mode base station.

It is understandable that the working standard of the multi-mode base station is also known as "working type" or "working mode". The multi-mode base station may be a multi-mode macro base station or multi-mode distributed base station.

Step 120: Determine a logic type corresponding to a BBU of the multi-mode base station according to the working standard of the multi-mode base station.

In this step, the logic type corresponding to the BBU is called a "first logic type".

As regards a multi-mode distributed base station, if the determined standard of a Radio Remote Unit (RRU) is Frequency Division Duplexing (FDD), the first logic type corresponding to the BBU of the multi-mode distributed base station is FDD, namely, the BBU needs to employ the FDD logic type; if the determined standard of the RRU is Time Division Duplexing (TDD), the logic type corresponding to the BBU of the multi-mode base station is TDD, namely, the BBU needs to employ the TDD logic type.

Step 130: Determine the type of software required for running the BBU according to the first logic type corresponding to the BBU and a hardware type of the BBU.

In step 120, the logic type corresponding to the BBU is determined. Therefore, in step 130, the type of the software required for running the BBU (namely, the running software type of the BBU) can be determined according to the logic type corresponding to the BBU determined in step 120 and the hardware type of the BBU.

Step 140: Obtain the software required for running the BBU according to the determined software type.

After the type of software required for running the BBU is already determined in steps 110-130, the software is downloaded to the multi-mode base station in step 140.

In the technical solution provided in this embodiment, before the software is downloaded, the working standard of the multi-mode base station is obtained, the logic type corresponding to the BBU is determined according to the working standard of the multi-mode base station, and the type of the software required for running the BBU is determined according to the logic type corresponding to the BBU and the hardware type of the BBU, and finally, the software is downloaded. In this way, it is ensured that the downloaded software matches the logic type of the BBU and the hardware type, and no software replenishment is required subsequently. The software of the BBU is downloaded accurately, and the software obtaining is more efficient and accurate.

Embodiment 2

Figure 2:
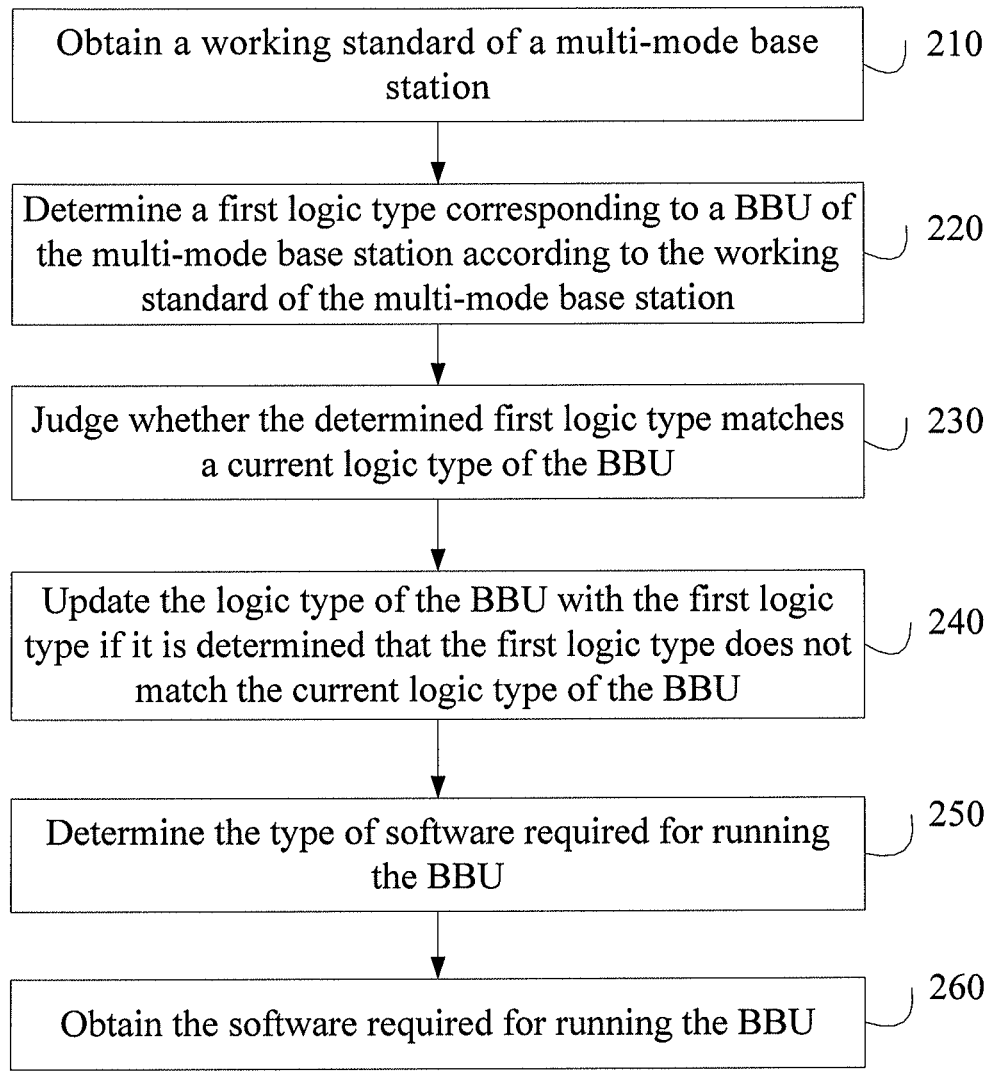
FIG. 2 is a schematic flowchart of a software obtaining method in Embodiment 2 of the present invention.

Embodiment 2 of the present invention relates to a software obtaining method. FIG. 2 is a schematic flowchart of the second embodiment of the present invention. As shown in FIG. 2, the software obtaining method in Embodiment 2 includes the following steps:

Step 210: Obtain a working standard of a multi-mode base station.

For the detailed obtaining method, see the first embodiment.

Step 220: Determine a first logic type corresponding to a BBU of the multi-mode base station according to the working standard of the multi-mode base station.

For the detailed determining method, see the first embodiment.

Step 230: Judge whether the determined first logic type matches a current logic type of the BBU.

In this step, the current logic type of the BBU is called a "second logic type".

Step 240: Update the logic type of the BBU with the first logic type if it is determined that the first logic type does not match the current logic type of the BBU.

Specifically, if it is determined that the first logic type does not match the current second logic type of the BBU, the data of the logic type of the BBU may be modified in the data area of the Main Processing and Transmission unit to change the logic type of the BBU.

It is understandable that if it is determined that the first logic type matches the current second logic type of the BBU, it is not necessary to update the logic type of the BBU with the first logic type.

Step 250: Determine the type of software required for running the BBU according to the first logic type corresponding to the BBU and a hardware type of the BBU.

For the detailed determining method, see the first embodiment.

Step 260: Obtain the software required for running the BBU according to the determined software type.

For the detailed obtaining method, see the first embodiment.

Step 230 and step 240 in this embodiment may occur between step 250 and step 260, or occur after step 260 according to the actual conditions.

Furthermore, in this embodiment, the judgment in step 230 may be omitted and step 240 may occur directly, namely, the logic type of the BBU is updated with the first logic type directly.

In the technical solution provided in this embodiment, a judgment operation is performed on the basis of the first embodiment. The judgment operation is: judging whether the determined first logic type matches the current logic type of the BBU. The logic type of the BBU is updated with the determined first logic type if the first logic type does not match the current logic type of the BBU. In this way, on the basis of improving efficiency and accuracy of software downloading, the logic type of the BBU is kept in the corresponding state with the change of the working standard of the multi-mode base station.

Embodiment 3

Figure 3:
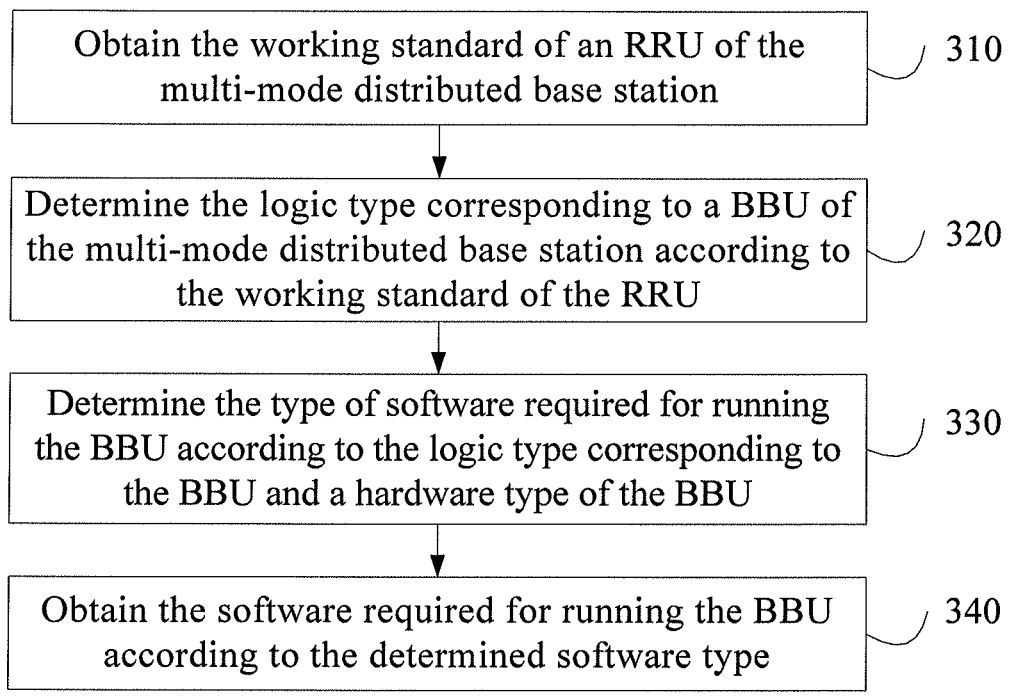
FIG. 3 is a schematic flowchart of a software obtaining method in Embodiment 3 of the present invention.

Embodiment 3 of the present invention relates to a software obtaining method. FIG. 3 is a schematic flowchart of the third embodiment of the present invention. As shown in FIG. 3, in this embodiment, it is assumed that the multi-mode base station is a multi-mode distributed base station. The method in this embodiment includes the following steps:

Step 310: Obtain the working standard of an RRU of the multi-mode distributed base station.

The step of obtaining the working standard of the multi-mode distributed base station includes: obtaining the working mode of the multi-mode distributed base station by obtaining the standard (namely, the standard applied during working) of the RRU of the multi-mode distributed base station. The standard of the RRU may be FDD or TDD.

Further, the standard of the RRU may be obtained according to the hardware version of the RRU. In addition, after the maintenance link of the RRU is set up, the standard of the RRU may also be obtained through topology scanning.

Step 320: Determine the logic type corresponding to a BBU of the multi-mode distributed base station according to the working standard of the RRU.

It is understandable that BBU is also an acronym of Building Baseband Unit. In this embodiment, the BBU refers to a base band unit of the multi-mode distributed base station.

As regards the multi-mode distributed base station, if the working standard of the RRU is obtained in step 310 is FDD, the logic type corresponding to the BBU of the multi-mode distributed base station is FDD, namely, the BBU needs to employ the FDD logic type; if the working standard of the RRU determined in step 310 is TDD, the logic type corresponding to the BBU of the multi-mode distributed base station is TDD, namely, the BBU needs to employ the TDD logic type.

Step 330: Determine the type of software required for running the BBU according to the logic type corresponding to the BBU and a hardware type of the BBU.

In step 320, the logic type corresponding to the BBU is already determined. Therefore, in step 330, the type of the software required for running the BBU (namely, the running software type of the BBU) can be determined according to the logic type corresponding to the BBU determined in step 320 and the hardware type of the BBU.

Step 340: Obtain the type of software required for running the BBU according to the determined software type.

After the type of software required for running the BBU is determined through steps 310-330, the software is downloaded to the multi-mode distributed base station in step 340.

In the process of starting up a multi-mode distributed base station, the NMS (such as an operation maintenance center) delivers a command of obtaining a software package to the multi-mode distributed base station. In this embodiment, after steps 310-330 are finished, the multi-mode base station may download the corresponding software through a software management module of the base station according to the command, of obtaining the software package, delivered by the NMS.

Generally, the software may be downloaded to the standby area of the Main Processing and Transmission unit of the base station. After the software is activated, the software is shifted to the master area of the Main Processing and Transmission unit, and then downloaded from the Main Processing and Transmission unit to the running area of the BBU.

In other embodiments of the present invention, the multi-mode base station may also be a multi-mode macro base station, and the working principles are similar.

Through the technical solution provided in this embodiment, the multi-mode distributed base station can download the software of the BBU accurately, which improves efficiency and accuracy of software obtaining. In a scenario of starting up a base station, the startup of the base station is quickened.

Embodiment 4

In Embodiment 3, it is assumed that the multi-mode base station is a multi-mode distributed base station.

It is understandable that if the multi-mode base station is a multi-mode macro base station, the step of obtaining the working standard of the multi-mode base station may include: obtaining the working standard of a Radio Frequency Unit (RFU) of the macro base station, or obtaining the working standard of the multi-mode macro base station directly.

The working standard of the RFU may be FDD or TDD. Accordingly, the step of determining the logic type corresponding to the BBU of the multi-mode base station according to the working standard of the RFU includes: determining that the logic type corresponding to the BBU of the multi-mode macro base station is FDD or TDD according to the working standard (FDD or TDD) of the RFU of the macro base station.

Alternatively, the working standard of the multi-mode macro base station may be second generation (2G), third generation (3G), or fourth generation (4G). Specifically, Global System for Mobile Communications (GSM) is taken as an example of 2G; Wideband Code Division Multiple Access (WCDMA) or Time Division-Synchronous Code Division Multiple Access (TD-SCDMA) or Code Division Multiple Access 2000 (CDMA2000) is taken as an example of 3G; and Long Term Evolution (LTE) is taken as an example of 4G. For example, if the multi-mode macro base station is a WCDMA+LTE dual-mode macro base station, it is necessary to determine whether the working standard of the multi-mode macro base station is WCDMA or LTE. The determining the mode may be based on the working standard employed by the RFU, or other determining methods understandable to those skilled in the art. The determining method is not limited in the embodiments of the present invention.

For the steps after the working standard of the multi-mode macro base station is determined, see the description in the embodiment of the multi-mode distributed base station.

Through the technical solution provided in this embodiment, the multi-mode macro base station can download the software of the BBU accurately, which improves efficiency and accuracy of software obtaining. In a scenario of starting up a base station, the startup of the base station is quickened.

Embodiment 5

Figure 4:
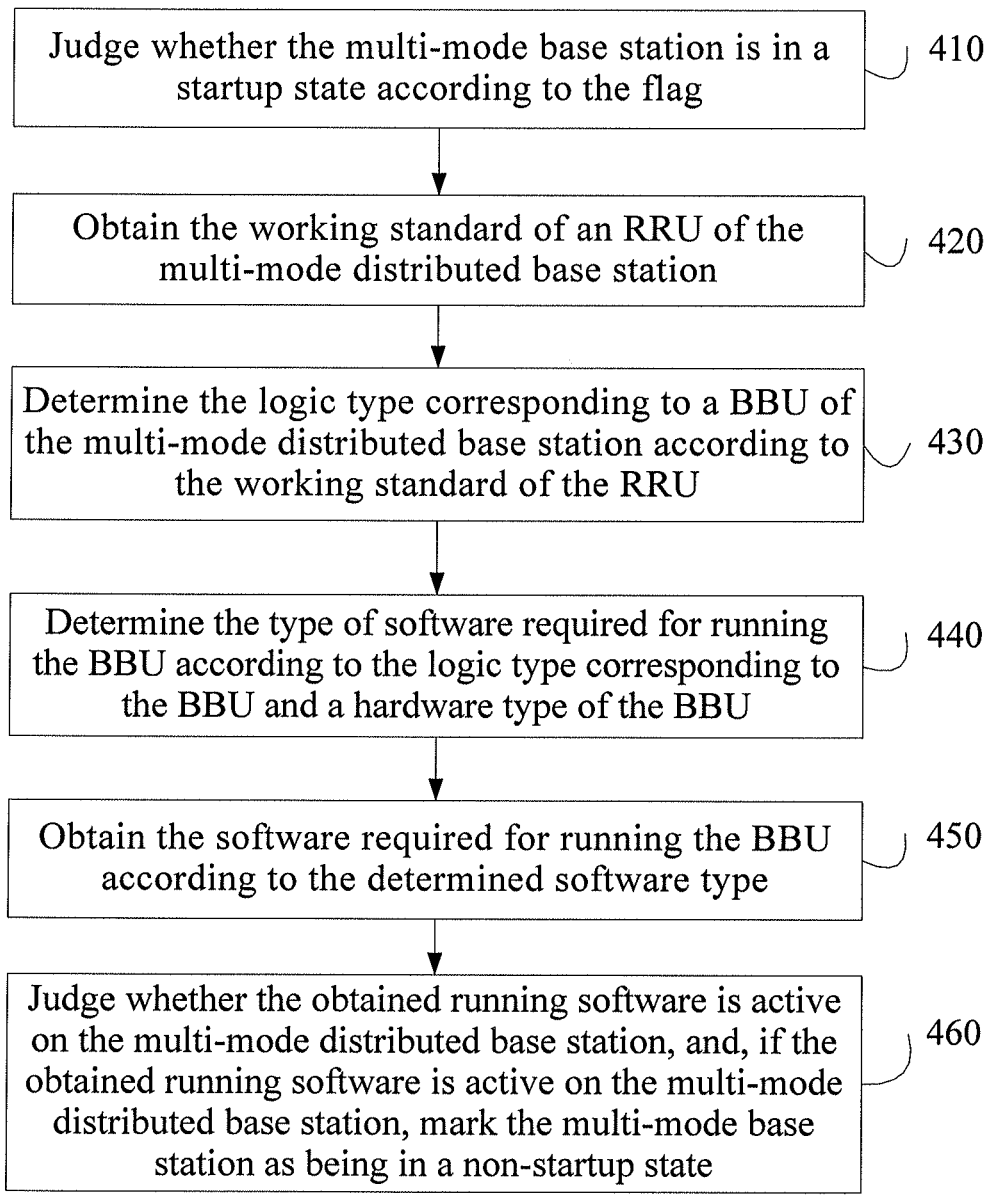
FIG. 4 is a schematic flowchart of a software obtaining method in Embodiment 5 of the present invention.

Embodiment of the present invention relates to a software obtaining method. FIG. 4 is a schematic flowchart of the fifth embodiment of the present invention. As shown in FIG. 4, in this embodiment, it is assumed that the multi-mode base station is a multi-mode distributed base station. The method in this embodiment includes the following steps:

Step 410: Judge whether the multi-mode base station is in a startup state according to a flag.

For example, a flag bit is set in the flash memory of the base station, or a flag bit is set by default before the base station is shipped out of the factory. When the flag bit is 1, the multi-mode base station is in a startup process; when the flag bit is 0, the multi-mode base station is not in the startup process. If it is determined that the base station is not in the startup process, the process after startup is performed as required directly; if it is determined that the base station is in the startup process, the procedure proceeds to the next step.

Step 420: Obtain the working standard of an RRU of the multi-mode distributed base station.

For details, see the third embodiment.

Step 430: Determine the logic type corresponding to a BBU of the multi-mode distributed base station according to the working standard of the RRU.

For details, see Embodiment 3.

Step 440: Determine the type of software required for running the BBU according to the logic type corresponding to the BBU and a hardware type of the BBU.

For details, see Embodiment 3.

Step 450: Obtain the software required for running the BBU according to the determined software type.

For details, see Embodiment 3.

Step 460: Judge whether the obtained running software is active on the multi-mode distributed base station, and, if the obtained running software is active on the multi-mode distributed base station, mark the multi-mode base station as being in a non-startup state.

After the running software of the BBU is obtained, judge whether the obtained running software is already active on the multi-mode base station, and, if the obtained running software is already active on the multi-mode base station, mark the multi-mode base station as being in the non-startup state.

More specifically, whether the Main Processing and Transmission unit can be started up normally is judged to determine whether the obtained software is active on the multi-mode distributed base station. If the obtained running software of the BBU is already active on the multi-mode distributed base station, a flag bit may be set. When the value of the flag bit is 0, it is indicated that the base station is not in the startup process. If the obtained running software of the BBU is not active on the multi-mode base station, the judgment may be made again after a period of time of waiting, until it is determined that the running software is active. After it is determined that the running software is active, the multi-mode distributed base station is marked as being in the non-startup state. Alternatively, in the startup process, if the startup fails which makes the obtained software not be active on the multi-mode base station, it is deemed that the obtained software is already invalid. In this case, the operation of software obtaining may be repeated, and the software downloading procedure in the startup of the base station may be repeated.

The foregoing description takes the multi-mode distributed base station as an example. It is understandable that the above procedure in the embodiment is also applicable to the case of multi-mode macro base station.

This embodiment adds a step of judging whether the base station is in the startup process, and the base station is marked as being in the non-startup process if the software is already active on the base station. It is understandable that this embodiment is intended for the scenario of starting up a base station, and improves efficiency and accuracy of software downloading in the scenario of starting up the base station. The completion of the startup is prompted in time, which helps the multi-mode base station to proceed with subsequent operations in time.

On the basis of this embodiment, a judgment step may be added, namely, judging whether the determined logic type matches the current logic type of the BBU. If it is determined that the determined logic type does not match the current logic type of the BBU, the current logic type of the BBU can be updated. For details, see the embodiments described above.

Embodiment 6

Figure 5:
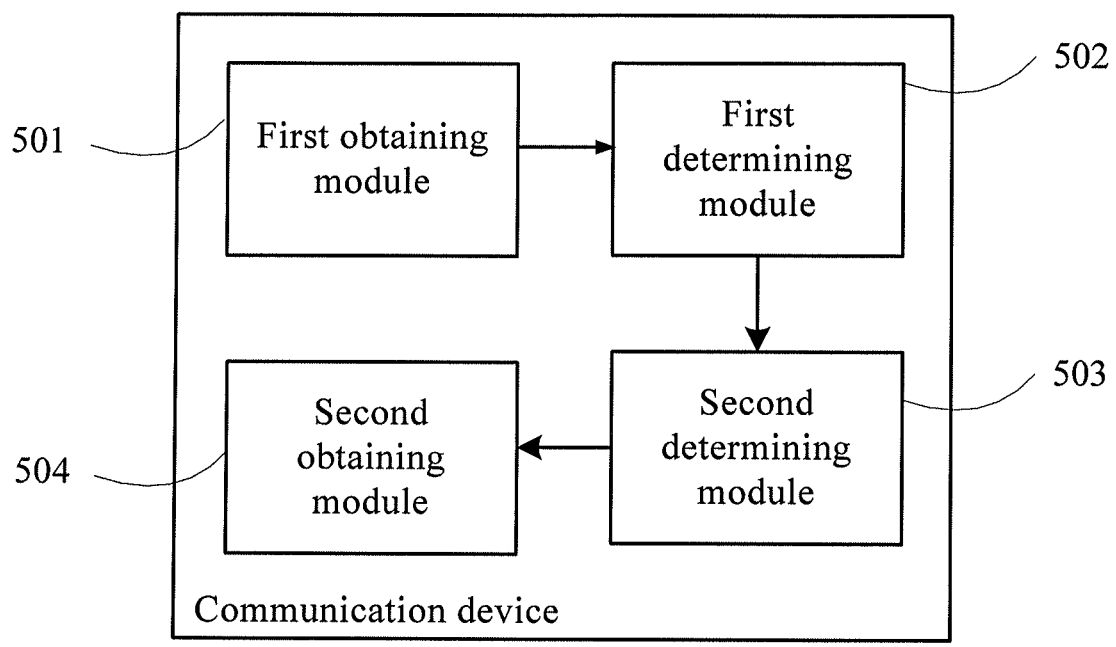
FIG. 5 is a schematic structure diagram of a communication device in Embodiment 6 of the present invention.

Embodiment 6 of the present invention relates to a device. FIG. 5 is a schematic structure diagram of a device provided in the embodiment of the present invention. In Embodiment 6 of the present invention, the device can improve efficiency and accuracy of software downloading.

The device may be existent independently or integrated in a multi-mode base station. For example, the device may be a base station, or specifically, a Main Processing and Transmission unit in the base station.

As shown in FIG. 5, the communication device provided in this embodiment may include a first obtaining module 501, a first determining module 502, a second determining module 503, and a second obtaining module 504.

The first obtaining module 501 is configured to obtain a working standard of a multi-mode base station.

It is understandable that the working standard of the multi-mode base station is also known as "working type" or "working mode". The multi-mode base station may be a multi-mode macro base station or multi-mode distributed base station.

The first determining module 502 is configured to determine a logic type corresponding to a BBU of the multi-mode base station according to the working standard of the multi-mode base station obtained by the first obtaining module 501.

The logic type corresponding to the BBU and determined by the first obtaining module 501 may be called a "first logic type". As regards a multi-mode distributed base station, if the determined standard of an RRU is FDD, the first logic type corresponding to the BBU of the multi-mode distributed base station is FDD, namely, the BBU needs to employ the FDD logic type; if the determined standard of the RRU is TDD, the logic type corresponding to the BBU of the multi-mode base station is TDD, namely, the BBU needs to employ the TDD logic type.

The second determining module 503 is configured to determine the type of software required for running the BBU according to the first logic type corresponding to the BBU and determined by the first determining module 502 and a hardware type of the BBU.

After the first determining module 502 determines the logic type corresponding to the BBU, the second determining module 503 determines the type of software required for running the BBU according to the hardware type of the BBU in combination with the logic type corresponding to the BBU.

The second obtaining module 504 is configured to obtain the software required for running the BBU according to the determined software type.

After the second determining module 503 determines the type of the software required for running the BBU, the second obtaining module 504 may download the software from the NMS. The files may be downloaded to the Main Processing and Transmission unit of the multi-mode base station.

Through the technical solution provided in this embodiment, the working standard of the multi-mode base station is determined; the first determining module determines the logic type corresponding to the BBU according to the working standard of the multi-mode base station; and the second determining module determines the type of the software required for running the BBU; finally, the second obtaining module obtains the software. In this way, it is ensured that the downloaded software is correct. In a scenario of starting up a multi-mode base station, it is not necessary to replenish software, which improves efficiency and accuracy of software downloading and shortens the time of starting up the base station.

Embodiment 7

Figure 6:
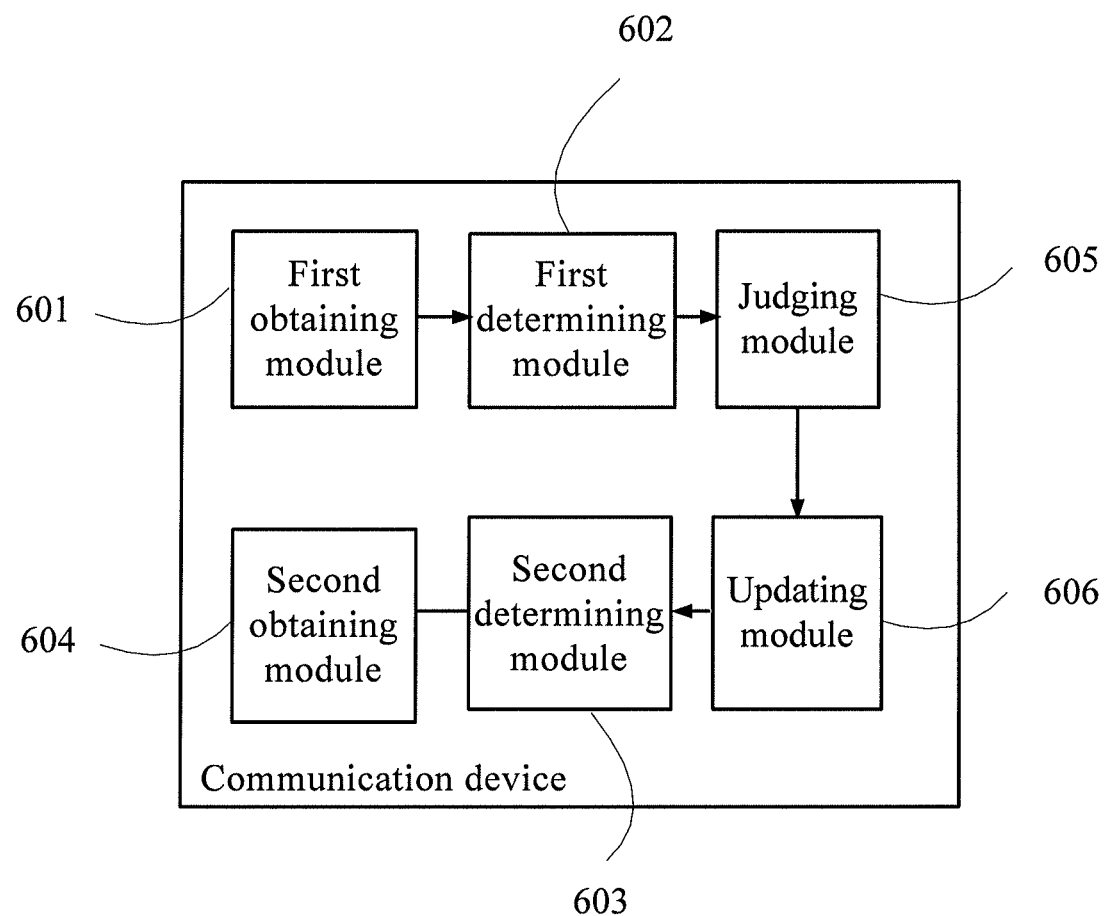
FIG. 6 is a schematic structure diagram of a communication device in Embodiment 7 of the present invention.

Embodiment 7 of the present invention relates to a communication device. FIG. 6 is a schematic structure diagram of a device in Embodiment 7 of the present invention. In Embodiment 7 of the present invention, the device includes a first obtaining module 601, a first determining module 602, a second determining module 603, and a second obtaining module 604. For detailed functions of the modules, see Embodiment 6.

Additionally, the device includes a judging module 605 and an updating module 606.

The judging module 605 is configured to: judge whether the first logic type determined by the first determining module 602 matches the current logic type of the BBU. In this embodiment, the current logic type of the BBU is also known as a second logic type.

The updating module 606 is configured to modify the data of the logic type of the BBU in the data area of the Main Processing and Transmission unit to change the logic type of the BBU if the judging module 605 determines that the first logic type does not match the current second logic type of the BBU.

It is understandable that if it is determined that the first logic type matches the current second logic type of the BBU, it is not necessary to update the logic type of the BBU.

In this embodiment, the judging module 605 may be omitted and the updating module 606 updates the logic type of the BBU with the first logic type directly.

In this embodiment, the first judging module 605 is added. The judgment result serves as a basis for deciding whether to update the logic type of the BBU, which avoids update of the logic type of the BBU when the current logic type of the BBU matches the logic type corresponding to the BBU, and avoids repeated operation and saves time of starting up the base station. Through the additional updating module 606, on the basis of improving efficiency and accuracy of software downloading, the logic type of the BBU is kept in the corresponding state with the change of the working standard of the multi-mode base station.

Embodiment 8

Figure 7:
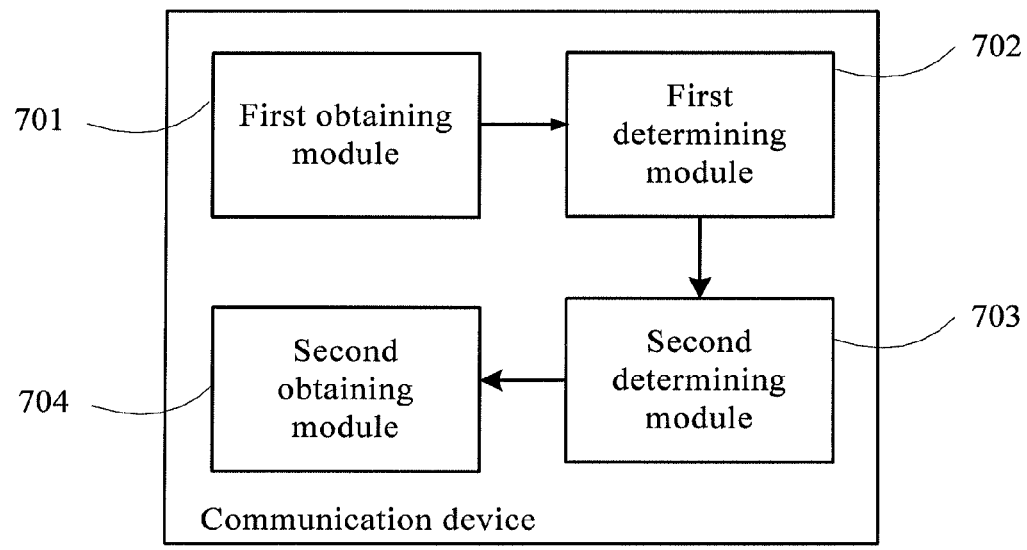
FIG. 7 is a schematic structure diagram of a communication device in Embodiment 8 of the present invention.

Embodiment 8 of the present invention relates to a device. FIG. 7 is a schematic structure diagram of a device in Embodiment 8 of the present invention. In Embodiment 8 of the present invention, the device includes a first obtaining module 701, a first determining module 702, a second determining module 703, and a second obtaining module 704. For detailed functions of the second determining module 703 and the second obtaining module 704, see Embodiment 6. In this embodiment, it is assumed that the multi-mode base station is a multi-mode distributed base station. Furthermore, the working standard of the multi-mode distributed base station may be 2G, 3G, or 4G.

The first obtaining module 701 is configured to obtain the working standard of an RRU of the multi-mode distributed base station.

The obtaining of working standard of the multi-mode distributed base station includes: obtaining the working mode of the multi-mode distributed base station by obtaining the standard (namely, the standard applied during working) of the RRU of the multi-mode distributed base station. The standard of the RRU may be FDD or TDD.

Further, the standard of the RRU may be obtained according to the hardware version of the RRU. In addition, after the maintenance link of the RRU is set up, the standard of the RRU may also be obtained through topology scanning.

The first determining module 702 is configured to determine the logic type corresponding to a BBU of the multi-mode distributed base station according to the working standard of the RRU.

As regards the multi-mode distributed base station, if the working standard of the RRU obtained by the first obtaining module 701 is FDD, the first logic type corresponding to the BBU of the multi-mode distributed base station is FDD, namely, the BBU needs to employ the FDD logic type; if the working standard of the RRU obtained by the first obtaining module 701 is TDD, the logic type corresponding to the BBU of the multi-mode distributed base station is TDD, namely, the BBU needs to employ the TDD logic type.

The second determining module 703 is configured to determine the type of software required for running the BBU according to the logic type corresponding to the BBU and a hardware type of the BBU.

After the first determining module 702 determines the logic type corresponding to the BBU, the second determining module 703 can determine the type of the software required for running the BBU (namely, running software type of the BBU) according to the logic type corresponding to the BBU determined by the first determining module 702 and the hardware type of the BBU.

The second obtaining module 704 is configured to obtain the software required for running the BBU according to the determined software type.

Because the first obtaining module 701, the first determining module 702, and the second determining module 703 already determine the type of the software required for running the BBU, the second obtaining module 704 downloads the software to the multi-mode distributed base station.

In other embodiments of the present invention, the multi-mode base station may also be a multi-mode macro base station. In this case, the first obtaining module obtains the working standard of the multi-mode macro base station, and the working principles are similar.

Through the technical solution provided in this embodiment, the multi-mode distributed base station can download the software of the BBU accurately, which improves efficiency and accuracy of software obtaining.

Embodiment 9

In Embodiment 8, it is assumed that the multi-mode base station is a multi-mode distributed base station.

It is understandable that if the multi-mode base station is a multi-mode macro base station, the first obtaining module obtains the working standard of an RFU of the macro base station, or obtains the working standard of the multi-mode macro base station directly.

The working standard of the RFU may be FDD or TDD. Accordingly, the step of determining the logic type corresponding to the BBU of the multi-mode base station according to the working standard of the RFU includes: determining that the logic type corresponding to the BBU of the multi-mode macro base station as FDD or TDD according to the working standard (FDD or TDD) of the RFU of the macro base station.

Alternatively, the working standard of the multi-mode macro base station may be 2G, 3G, or 4G. Specifically, GSM is taken as an example of 2G, WCDMA or TD-SCDMA or CDMA2000 is taken as an example of 3G, and LTE is taken as an example of 4G. For example, if the multi-mode macro base station is a WCDMA+LTE dual-mode macro base station, it is necessary to determine whether the working standard of the multi-mode macro base station is WCDMA or LTE. The determining the mode may be based on the working standard employed by the RFU, or other determining methods understandable to those skilled in the art. The determining method is not limited in the embodiments of the present invention.

After the first obtaining module obtains the working standard of the multi-mode macro base station, the first determining module, the second determining module and the second obtaining module work in the way described in the embodiment of the multi-mode distributed base station.

Through the technical solution provided in this embodiment, the multi-mode macro base station can download the software of the BBU accurately, which improves efficiency and accuracy of software obtaining. In a scenario of starting up a base station, the startup of the base station is quickened.

Embodiment 10

Figure 8:
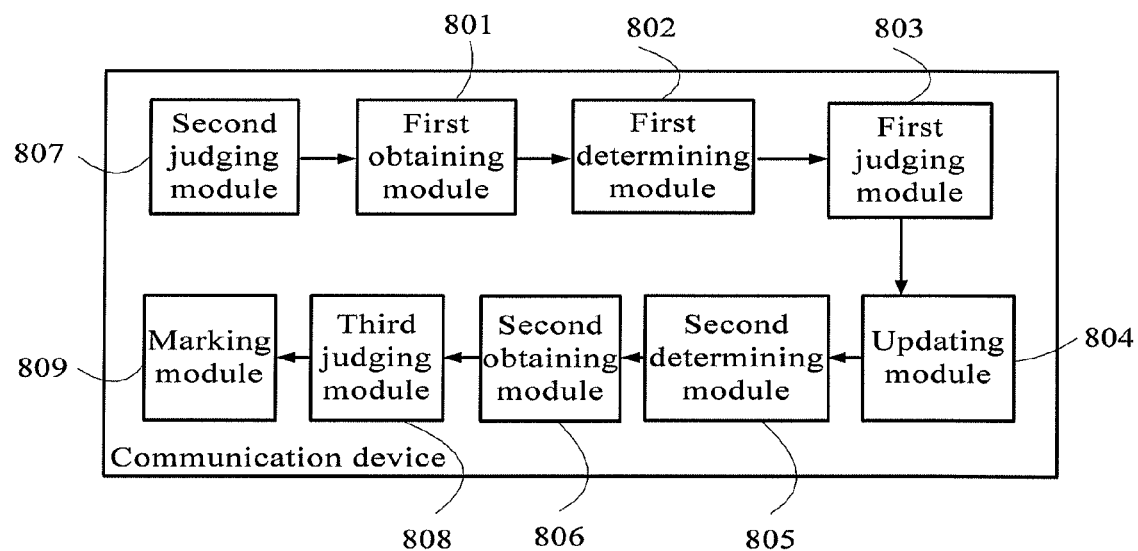
FIG. 8 is a schematic structure diagram of a communication device in Embodiment 10 of the present invention.

Embodiment 10 of the present invention relates to a device. FIG. 8 is a schematic structure diagram of a device in Embodiment 10 of the present invention. In Embodiment 10 of the present invention, the device includes a first obtaining module 801, a first determining module 802, a first judging module 803, an updating module 804, a second determining module 805, and a second obtaining module 806. For detailed functions of the modules, see Embodiment 7.

The device further includes: a second judging module 807, which is configured to judge whether the multi-mode base station is in a startup state according to a flag before the first obtaining module 801 obtains the working standard of the multi-mode base station; a third judging module 808, which is configured to judge whether the obtained software required for running the BBU is active on the multi-mode base station after the second obtaining module 806 obtains the software required for running the BBU; and a marking module 809, which is configured to mark the multi-mode base station as being in a non-startup state after the third judging module 808 determines that the software required for running the BBU is already active on the multi-mode base station.

As shown in FIG. 8, the device Embodiment 10 includes a second judging module 807, which is configured to judge whether the multi-mode base station is in the startup state according to the flag before the first obtaining module 801 obtains the working standard of the multi-mode base station. The second judging module 807 may make the judgment according to a flag bit. For example, a flag bit is set, and the second judging module 807 determines that the multi-mode base station is in a startup process if the value of the flag bit is 1, or determines that the multi-mode base station is not in the startup process if the value of the flag bit is 0.

The third judging module 808 is configured to judge whether the obtained software required for running the BBU is active on the multi-mode base station after the second obtaining module 806 obtains the software required for running the BBU. The third judging module 808 judges whether the obtained software is active on the multi-mode base station by judging whether the Main Processing and Transmission unit is started up normally.

The device further includes a marking module 809. If the obtained running software of the BBU is already active on the multi-mode base station, the marking module 809 may set a flag bit. When the value of the flag bit is 0, it is indicated that the base station is not in the startup process. Alternatively, in the startup process, if the startup fails which makes the obtained software not be active on the multi-mode base station, it is deemed that the obtained software has is already invalid. In this case, the operation of software obtaining may be repeated, and the software downloading procedure in the startup of the base station may be repeated.

The second judging module 807 is added in this embodiment to judge whether the multi-mode base station is in the startup process, which avoids startup operation performed when the multi-mode base station is not in the startup process. Moreover, the third judging module 808 judges whether the obtained running software of the BBU is active on the base station. If the software is already active, the base station is marked as being in a non-startup process. In this way, the completion of the startup procedure is prompted in time, which helps the multi-mode base station to perform subsequent operations in time.

The embodiments of the present invention are applicable to systems such as LTE, WCDMA, GSM, TD-SCDMA, CDMA2000, and Worldwide Interoperability for Microwave Access (WiMAX). In such systems, the communication device may be a base station (specifically, a Main Processing and Transmission unit of the base station), or a Base Station Controller (BSC), or other network devices that need to download software, especially, network devices that need to obtain software in a scenario of starting up the base station.

The serial number of the embodiment herein is designed to facilitate description, but is not intended as a basis of preference order between the embodiments.

For brevity of description, the detailed working procedures of the systems, devices, modules and units described above are not repeated herein because they can be deduced by those skilled in the art effortlessly according to the corresponding procedures described in the method embodiments above.

After reading the foregoing embodiments, those skilled in the art are clearly aware that the embodiments of the present invention may be implemented through hardware, or, preferably in most circumstances, through software in addition to a necessary universal hardware platform. Therefore, the technical solution under the present invention or its novelty in contrast to the prior art may be embodied in a software product. The software product may be stored in computer-readable storage media and incorporates several instructions for instructing a computer device (for example, personal computer, server, or network device) to execute all or part of the steps of the method specified in any embodiment of the present invention. The storage media may be a USB flash disk, mobile hard disk, Read-Only Memory (ROM), Random Access Memory (RAM), magnetic disk, or optical disk which can store program codes.

It should be understood that in the embodiments described herein, the disclosed systems, devices and methods may be implemented in other modes without going beyond the scope of this application. For example, the apparatus embodiments above are illustrative in nature, and the modules or units of the apparatus are assigned from the perspective of logical functions only and may be assigned in a different way in practical application; and multiple units or components may be combined or integrated into another system, or some features are omissible. The units described as stand-alone components above may be separated physically or not; and the components illustrated as units may be physical units or not, namely, they may be located in one place, or distributed on multiple network elements. Some or all of the modules described above may be selected as required to fulfill the objectives of the technical solution under the present invention, which can be understood and implemented by those skilled in the art without any creative effort.

The systems, devices, methods and accompanying drawings given herein may be combined or integrated with other systems, modules, techniques or methods without going beyond the scope of this application. Besides, the coupling, direct coupling or communication connection illustrated or discussed herein may be implemented through indirect coupling or communication connection between interfaces, apparatuses or units, and may be electronic, mechanic, or in other forms.

The above descriptions are merely specific embodiments of the present invention, but not intended to limit the protection scope of the present invention. Any modification or replacement that can be easily derived by those skilled in the art shall fall within the protection scope of the present invention. Therefore, the protection scope of the present invention is subject to the appended claims.

What is claimed is:

1. A method for obtaining software, comprising:
obtaining, by a multi-mode base station, a working standard of the multi-mode base station itself;
determining, by the multi-mode base station, a first logic type corresponding to a Base-Band Unit (BBU) of the multi-mode base station according to the working standard of the multi-mode base station itself;
determining, by the multi-mode base station, a type of software required for running the BBU according to the determined first logic type and a hardware type of the BBU;
obtaining, by the multi-mode base station, the software required for running the BBU according to the determined type of software;
determining, by the multi-mode base station, whether the determined first logic type matches a current logic type of the BBU of the multi-mode base station; and
updating, by the multi-mode base station, the logic type of the BBU with the first logic type if it is determined that the first logic type does not match the current logic type of the BBU.

2. The method according to claim 1, wherein:
the multi-mode base station is a multi-mode macro base station or multi-mode distributed base station; and
if the multi-mode base station is a multi-mode distributed base station, the step of obtaining the working standard of the multi-mode base station comprises:
obtaining a working standard of a Radio Remote Unit (RRU) of the multi-mode distributed base station to obtain a working mode of the multi-mode distributed base station.

3. The method according to claim 2, wherein:
the obtaining the working standard of the RRU of the multi-mode distributed base station comprises:
finding out that the RRU is in a Frequency Division Duplexing (FDD) or Time Division Duplexing (TDD) mode.

4. The method according to claim 1, further comprising at least one of:
judging whether the multi-mode base station is in a startup state according to a flag before the obtaining the working standard of the RRU of the multi-mode base station; and
judging whether obtained software is active on the multi-mode base station after obtaining the software; and
marking the multi-mode base station as being in a non-startup state if the software is already active on the multi-mode base station.

5. A communication device, comprising a hardware processor and a non-transitory storage medium configured to store modules comprising:
a first obtaining module, configured to obtain a working standard of a multi-mode base station in the communication device;
a first determining module, configured to determine a first logic type corresponding to a Base-Band Unit (BBU) of the multi-mode base station according to the working standard of the multi-mode base station;
a second determining module, configured to determine a type of software required for running the BBU according to the first logic type determined by the first determining module and a hardware type of the BBU;
a second obtaining module, configured to obtain the software required for running the BBU according to the type of software determined by the second determining module;
a first judging module, configured to determine whether the first logic type determined by the first determining module matches a current logic type of the BBU; and
an updating module, configured to update the logic type of the BBU with the first logic type if the first judging module determines that the first logic type does not match the current logic type of the BBU.

6. The device according to claim 5, wherein:
the multi-mode base station is a multi-mode macro base station or multi-mode distributed base station; and
if the multi-mode base station is a multi-mode distributed base station, the first obtaining module is configured to obtain the working standard of the multi-mode distributed base station by obtaining a working standard of a Radio Remote Unit (RRU) of the multi-mode distributed base station.

7. The device according to claim 5, further comprising:
a second judging module, configured to judge whether the multi-mode base station is in a startup state according to a flag.

8. The device according to claim 7, further comprising:
a third judging module, configured to judge whether the obtained software required for running the BBU is active on the multi-mode base station; and
a marking module, configured to mark the multi-mode base station as being in a non-startup state after the third judging module determines that the software required for running the BBU is already active on the multi-mode base station.

9. A multi-mode base station, comprising a main processing and transmission unit and a Base-Band Unit (BBU), the base station programmed to:
obtain a working standard of the multi-mode base station itself;
determine a first logic type corresponding to the BBU of the multi-mode base station according to the obtained working standard;
determine a type of software required for running the BBU according to the first logic type and a hardware type of the BBU; and
obtain the software required for running the BBU according to the determined type of software;
determine whether the first logic type matches a current logic type of the BBU; and
modify the data of the logic type of the BBU in a data area of the main processing and transmission unit to change the logic type of the BBU.

10. The multi-mode base station of claim 9, further programmed to:
determine whether the first logic type matches a current logic type of the BBU; and
update the logic type of the BBU with the first logic type when the first logic type does not match the current logic type of the BBU.

11. The multi-mode base station of claim 9, further programmed to:
obtain the working standard of a multi-mode distributed base station by obtaining a working standard of a Radio Remote Unit (RRU) of the multi-mode distributed base station when the multi-mode base station is a multi-mode distributed base station.

12. The multi-mode base station of claim 9, further programmed to:
 determine whether the multi-mode base station is in a startup state according to a flag.

13. The multi-mode base station of claim 12, further programmed to:
 judge whether the obtained software required for running the BBU is active on the multi-mode base station; and
 mark the multi-mode base station as being in a non-startup state after determining that the software required for running the BBU is already active on the multi-mode base station.

\* \* \* \* \*